U S011411428B2

United States Patent
Maeba et al.

(10) Patent No.: US 11,411,428 B2
(45) Date of Patent: Aug. 9, 2022

(54) POWER CONVERTER, POWER CONVERSION SYSTEM

(71) Applicant: Panasonic Intellectual Property Management Co., Ltd., Osaka (JP)

(72) Inventors: Kota Maeba, Mie (JP); Akihiro Kikuchi, Osaka (JP); Wataru Horio, Osaka (JP); Hiroyuki Fujii, Nara (JP); Kenji Hanamura, Osaka (JP); Tomoki Ito, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 202 days.

(21) Appl. No.: 16/582,156

(22) Filed: Sep. 25, 2019

(65) Prior Publication Data

US 2020/0019199 A1 Jan. 16, 2020

Related U.S. Application Data

(63) Continuation of application No. PCT/JP2018/001805, filed on Jan. 22, 2018.

(30) Foreign Application Priority Data

Mar. 30, 2017 (JP) .............................. JP2017-068996

(51) Int. Cl.
*H02J 1/10* (2006.01)
*H02J 13/00* (2006.01)
(Continued)

(52) U.S. Cl.
CPC .............. *H02J 13/00* (2013.01); *H02J 1/102* (2013.01); *H02J 3/38* (2013.01); *H02J 7/35* (2013.01);
(Continued)

(58) Field of Classification Search
CPC .................. H02M 3/156; H02M 7/48; H02M 2001/0067; H02M 1/0067; G05F 1/46;
(Continued)

(56) References Cited

U.S. PATENT DOCUMENTS

2004/0207366 A1 10/2004 Sung
2014/0132169 A1\* 5/2014 Boeke ........................ H02J 3/46
315/201

(Continued)

FOREIGN PATENT DOCUMENTS

EP 3029798 A1 6/2016
JP 2009-033797 A 2/2009
(Continued)

OTHER PUBLICATIONS

Extended European Search Report for corresponding Application No. 18777360.1-1202 PCT/JP2018001805, dated Nov. 12, 2019.
(Continued)

*Primary Examiner* — Thienvu V Tran
*Assistant Examiner* — Shahzeb K Ahmad
(74) *Attorney, Agent, or Firm* — Renner, Otto, Boisselle & Sklar, LLP

(57) ABSTRACT

In a power converter including: a first DC-DC converter, an inverter, and a control circuit, a second DC-DC converter that controls an input and an output of a power storage unit is connectable to a DC bus. The control circuit deactivates a reverse power flow suppression function for suppressing a reverse power flow from the inverter to a power system when the second DC-DC converter is not connected to the DC bus and activates the reverse power flow suppression function when the second DC-DC converter is connected to the DC bus.

7 Claims, 2 Drawing Sheets

(51) Int. Cl.
*H02M 7/48* (2007.01)
*H02J 3/38* (2006.01)
*H02J 7/35* (2006.01)
*G05F 1/46* (2006.01)
*H02M 3/156* (2006.01)
*H02M 1/00* (2006.01)
*H02J 3/32* (2006.01)
*H02J 1/12* (2006.01)

(52) U.S. Cl.
CPC ............... *H02M 7/48* (2013.01); *G05F 1/46* (2013.01); *H02J 1/12* (2013.01); *H02J 3/32* (2013.01); *H02M 1/0067* (2021.05); *H02M 3/156* (2013.01); *Y02B 90/20* (2013.01)

(58) Field of Classification Search
CPC ...... H02J 1/102; H02J 3/38; H02J 3/32; H02J 7/35; H02J 13/00
USPC ........................................................ 323/282
See application file for complete search history.

(56) References Cited

U.S. PATENT DOCUMENTS

| | | | |
|---|---|---|---|
| 2017/0187190 A1* | 6/2017 | Asano | H02J 3/383 |
| 2018/0013291 A1* | 1/2018 | Ohashi | H02M 1/34 |
| 2018/0037121 A1* | 2/2018 | Narla | B60L 53/00 |
| 2018/0233914 A1* | 8/2018 | Miki | H02J 7/0068 |
| 2019/0322177 A1* | 10/2019 | Shirahashi | B60L 1/00 |
| 2019/0326752 A1* | 10/2019 | Kikuchi | H02J 1/102 |

FOREIGN PATENT DOCUMENTS

| | | |
|---|---|---|
| JP | 2015-122906 A | 7/2015 |
| JP | 2016-158435 A | 9/2016 |

OTHER PUBLICATIONS

International Search Report for corresponding Application No. PCT/JP2018/001805, dated Mar. 20, 2018.

* cited by examiner

POWER CONVERTER, POWER CONVERSION SYSTEM

CROSS-REFERENCE TO RELATED APPLICATIONS

This application is a Continuation of International Application No. PCT/JP2018/001805, filed on Jan. 22, 2018, which in turn claims the benefit of Japanese Application No. 2017-068996, filed on Mar. 30, 2017, the disclosures of which application are incorporated by reference herein.

BACKGROUND

1. Field of the Invention

The present invention relates to a power converter and a power conversion system that convert a DC power into an AC power.

2. Description of the Related Art

Distributed power supplies connected to a grid for operation that are currently available use solar cells, fuel cells, stationary storage batteries, vehicle-mounted storage batteries, etc. as power supply sources. Typically, a distributed power system connected to a grid for operation is configured such that a single distributed power supply is used and connected to a grid for operation via a DC-DC converter, a DC bus, and an inverter or such that a plurality of distributed power supplies are used and are connected to a grid for operation via respective DC-DC converters, a common DC bus, and one inverter (see, for example, patent literature 1).

In the latter case, a plurality of DC-DC converters and one inverter may be installed in one housing, or at least one DC-DC converter and one inverter are installed in isolated housings.

Even in a configuration in which the DC-DC converters and an inverter are installed in one housing, there are cases in which the DC-DC converters and the inverter are independently controlled by separate control devices (e.g., microcomputers). In distributed power supply systems in which the DC-DC converters and the inverter are physically isolated or isolated in terms of control, adjustment need be made between the respective power conversion units.

In a distributed power supply system in which a solar cell and a stationary storage battery are combined, for example, it is necessary to suppress a reverse power flow when a reverse power flow occurs at the time of discharge from the stationary storage battery. In a photovoltaic power generation system not connected to a stationary storage battery, it is not necessary to suppress a reverse power flow. Rather, it is desired to sell the power.

[Patent Literature 1] JP2015-122906

As described above, a reverse power flow need be handled differently depending on the system configuration. In the case of introducing only a photovoltaic power generation system to reduce the initial cost and connecting a storage battery later to build a coordinated generation-storage system in which the solar cell and the stationary storage battery are combined, for example, it had been necessary to add a reverse power flow suppression function later.

Further, in the case the storage battery is removed from a coordinated generation-storage system to configure a simple photovoltaic power generation system when it is no longer possible to charge or discharge the storage battery due to deterioration of the storage battery, the reverse power flow suppression function may remain unremoved.

SUMMARY OF THE INVENTION

The disclosure addresses the above-described issue, and a general purpose thereof is to provide a power converter and a power conversion system in which handling of a reverse power flow is optimized.

A power converter according to an embodiment includes: a first DC-DC converter that converts a voltage of a DC power output from a power generator that generates power based on a renewable energy and outputs the DC power as converted to a DC bus; and an inverter connected via the DC bus to convert the DC power on the DC bus into an AC power and supplies the AC power as converted to a load or a power system; and a control circuit that controls the inverter. A second DC-DC converter that controls an input and an output of a power storage unit is connectable to the DC bus, and the control circuit deactivates a reverse power flow suppression function for suppressing a reverse power flow from the inverter to the power system when the second DC-DC converter is not connected to the DC bus and activates the reverse power flow suppression function when the second DC-DC converter is connected to the DC bus.

BRIEF DESCRIPTION OF THE DRAWINGS

The figures depict one or more implementations in accordance with the present teaching, by way of example only, not by way of limitations. In the figures, like reference numerals refer to the same or similar elements.

DETAILED DESCRIPTION

One aspect of the invention will now be described by reference to the preferred embodiments. This does not intend to limit the scope of the present invention, but to exemplify the invention.

Figure 1:
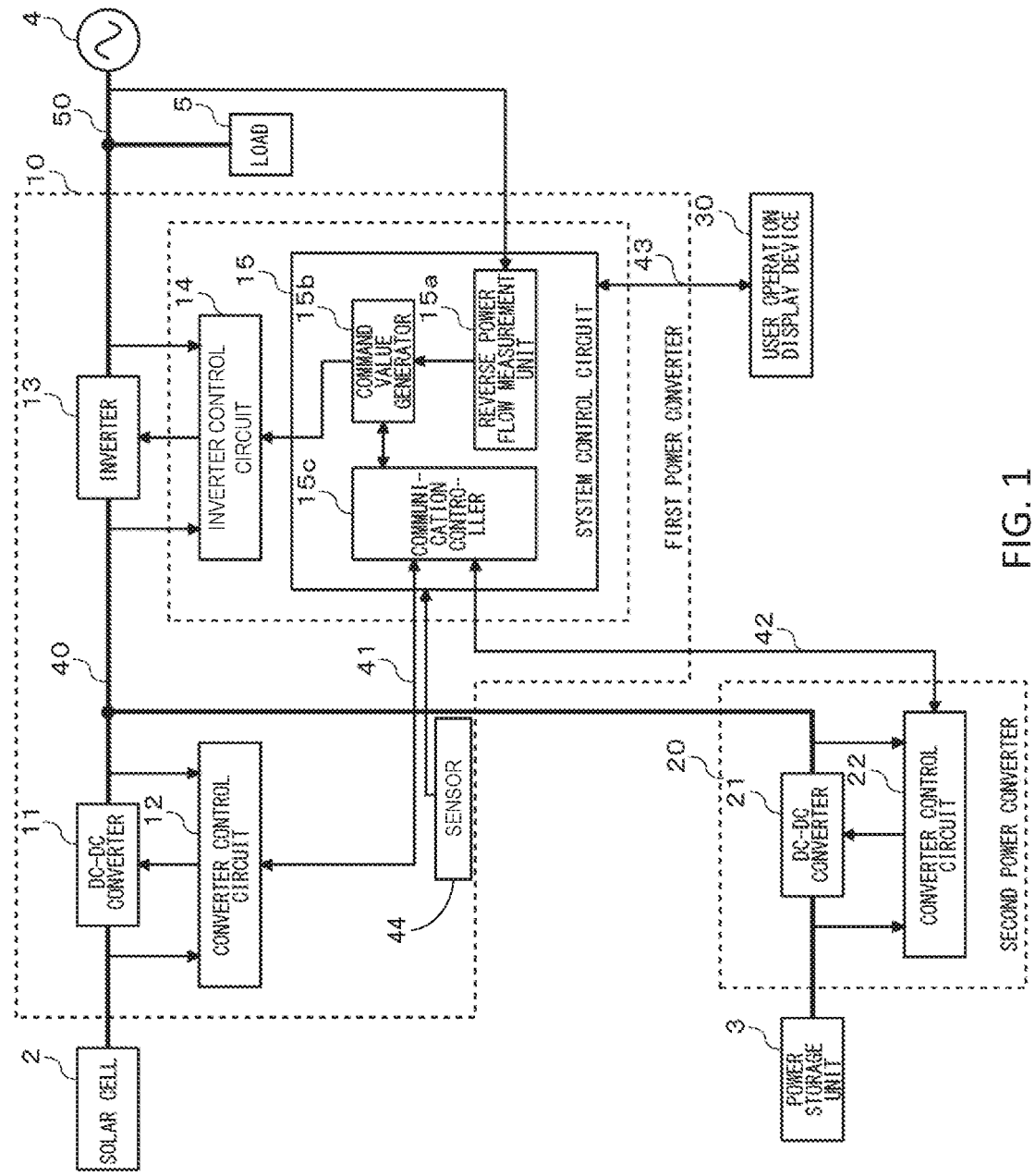
FIG. 1 shows a power conversion system according to an embodiment of the disclosure.

FIG. 1 shows a power conversion system 1 according to an embodiment of the disclosure. The power conversion system 1 includes a first power converter 10 and a second power converter 20. The first power converter 10 is a power conditioner system for a solar cell 2, and the second power converter 20 is a power conditioner system for a power storage unit 3. FIG. 1 shows an example in which a power conditioner system for the power storage unit 3 is added to an existent power conditioner system for the solar cell 2.

The solar cell 2 is a power generator that uses photovoltaic effect to convert light energy into electric power directly. A silicon solar cell, a solar cell made of a compound semiconductor, etc., a dye-sensitized solar cell (organic solar cell) or the like is used as the solar cell 2. The solar cell 2 is connected to the first power converter 10 and outputs a generated power to the first power converter 10.

The first power converter 10 includes a DC-DC converter 11, a converter control circuit 12, an inverter 13, an inverter control circuit 14, and a system control circuit 15. The system control circuit 15 includes a reverse power flow measurement unit 15a, a command value generator 15b, and a communication controller 15c. The DC-DC converter 11 and the inverter 13 are connected by a DC bus 40. The converter control circuit 12 and the system control circuit 15 are connected by a communication line 41. Communication compatible with a predefined serial communication standard (e.g., RS-485 standard, TCP-IP standard) is performed between the converter control circuit 12 and the system control circuit 15.

The DC-DC converter 11 converts a DC power output from the solar cell 2 into a DC power of a desired voltage value and outputs the DC power as converted to the DC bus 40. For example, the DC-DC converter 11 may be formed by a step-up chopper.

The converter control circuit 12 controls the DC-DC converter 11. The converter control circuit 12 subjects, for basic control, the DC-DC converter 11 to maximum power point tracking (MPPT) control to maximize the output power of the solar cell 2. Specifically, the converter control circuit 12 measures the input voltage and the input current of the DC-DC converter 11, which are the output voltage and the output current of the solar cell 2, to estimate the power generated by the solar cell 2. The converter control circuit 12 generates a command value to bring the power generated by the solar cell 2 to the maximum power point (optimal operating point) based on the output voltage of the solar cell 2 measured and the generated power as estimated. For example, the converter control circuit 12 changes the operating point voltage in predetermined step sizes according to the hill climbing method to search for the maximum power point and generates a command value to maintain the maximum power point. The DC-DC converter 11 is switched into operation in accordance with a drive signal based on the command value generated.

The inverter 13 is a bidirectional converter and converts the DC power input via the DC bus 40 into an AC power and outputs the AC power as converted to a power distribution line 50 connected to a commercial power system (hereinafter, simply referred to as the system 4). A load 5 is connected to the power distribution line 50. The inverter 13 converts the AC power supplied from the system 4 into a DC power and outputs the DC power as converted to the DC bus 40. A smoothing electrolytic capacitor (not shown) is connected to the DC bus 40.

The inverter control circuit 14 controls the inverter 13. For basic control, the inverter control circuit 14 controls the inverter 13 to maintain the voltage on the DC bus 40 at a first threshold voltage. More specifically, the inverter control circuit 14 detects the voltage on the DC bus 40 and generates a command value to cause the detected bus voltage to match the first threshold voltage. When the voltage on the DC bus 40 is higher than the first threshold voltage, the inverter control circuit 14 generates a command value to raise the duty ratio of the inverter 13. When the voltage on the DC bus 40 is lower than the first threshold voltage, the inverter control circuit 14 generates a command value to lower the duty ratio of the inverter 13. The inverter 13 is switched into operation in accordance with a drive signal based on the generated command value.

The power storage unit 3 is capable of discharging or discharging power and includes a lithium ion battery, a nickel hydride storage battery, a lead storage battery, an electric double layer capacitor, a lithium ion capacitor, or the like. The power storage unit 3 is connected to the second power converter 20.

The second power converter 20 includes a DC-DC converter 21 and a converter control circuit 22. The converter control circuit 12 and the system control circuit 15 of the first power converter 10 are connected by a communication line 42. Communication compatible with a predefined serial communication standard is performed between the converter control circuit 12 and the system control circuit 15.

The DC-DC converter 21 is a bidirectional converter connected between the power storage unit 3 and the DC bus 40 to charge or discharge the power storage unit 3. The converter control circuit 22 controls the DC-DC converter 21. For basic control, the converter control circuit 22 controls the DC-DC converter 21 based on the command value transmitted from the system control circuit 15 so as to charge/discharge the power storage unit 3 at a constant current (CC)/constant voltage (CV). For example, the converter control circuit 22 receives a power command value from the system control circuit 15 at the time of discharge. The converter control circuit 22 produces a current command value by dividing the power command value by the voltage of the power storage unit 3 and discharges the DC-DC converter 21 at a constant current.

A user operation display device 30 is a user interface of the first power converter 10 and is provided at a predetermined indoor position. For example, the user operation display device 30 can be formed by a touch panel display to provide predetermined information to the user and acknowledge a user operation from the user. The user operation display device 30 and the system control circuit 15 are connected by a communication line 43. Communication compatible with a predefined serial communication standard is performed between the user operation display device 30 and the system control circuit 15. The user operation display device 30 and the system control circuit 15 may be connected wirelessly.

When the electricity generated by the solar cell 2 is increased due to a variation in solar radiation or the power consumed by the load 5 is lowered while the power storage unit 3 is being discharged, a reverse power flow to the system 4 may occur, creating a state of selling the power. The grid-interconnection code of Japan prohibits causing a power 5% or more of the rating capacity of the storage battery to flow reversely from a power storage system to the system 4 for a duration longer than 500 ms. When a reverse power flow is detected in the power conversion system 1 connected to the power storage unit 3, therefore, it is necessary to suppress a reverse power flow within a time frame of 500 ms.

Methods to suppress the output power of the inverter 13 include a method of suppressing the output power of the DC-DC converter 11 of the solar cell 2, a method of suppressing the output power of the DC-DC converter 21 of the power storage unit 3, and a method of suppressing the output power of the inverter 13. The method of suppressing the output power of the DC-DC converter 11 of the solar cell 2 leads to a waste of the electricity generated by the solar cell 2. Therefore, suppression of the output of the DC-DC converter 11 of the solar cell 2 is the last mode of control that should be performed.

The method of suppressing the output power of the DC-DC converter 21 is the most direct control because that only requires stopping the discharge from the power storage unit 3 when a reverse power flow is detected. When the second power converter 20 is isolated from the first power converter 10 and is provided at a position remote from the system 4, however, a time lag could easily occur since the detection of a reverse power flow until the suppression of the output from the DC-DC converter 21 of the power storage unit 3.

In the configuration shown in FIG. 1, the reverse power flow measurement unit 15a of the first power converter 10 detects the occurrence of a reverse power flow based on the measured values of a CT sensor (not shown) provided on the power distribution line 50. The converter control circuit 22 of the second power converter 20 receives information indicating the detection of a reverse power flow from the system control circuit 15 via the communication line 42. The communication line 42 is often installed along the DC bus 40 connecting the first power converter 10 and the second power converter 20. In this configuration, the communication line 42 is affected by the noise from the DC bus 40. In digital communication using binary voltage values, the shorter the unit period of time for 1 bit, the more susceptible the communication is to the noise. Basically, the higher the communication speed, the more likely it is that a bit error is generated.

Thus, according to a method whereby the first power converter 10 detects a reverse power flow, generates communication data that directs output suppression, and transmits the communication data to the second power converter 20 via the communication line 42, the time limit (500 ms) defined by the grid-interconnection code may not be observed. Also, the noise may change the content of communication data in the middle.

In this background, one conceivable method is to suppress the output power of the inverter 13 first and suppress the output power of the DC-DC converter 21 of the power storage unit 3 later. As described above, the inverter control circuit 14 controls, for basic control, the inverter 13 so that the voltage on the DC bus 40 is maintained at the first threshold voltage. In the event that a reverse power flow occurs, the inverter control circuit 14 preferentially performs output suppression control. More specifically, the inverter control circuit 14 controls the inverter 13 so that the output of the inverter 13 does not exceed the command value (more specifically, the upper limit current value or the upper limit power value) generated by the command value generator 15b. While the output is being suppressed, bus voltage stabilization control for controlling the voltage on the DC bus 40 to be maintained at the first threshold voltage is stopped.

At a point of time when suppression of the output of the inverter 13 is started, suppression of the output from the DC-DC converter 11 of the solar cell 2 and/or the DC-DC converter 21 of the power storage unit 3 has not started. Therefore, the input power of the inverter 13 will be excessive relative to the output power of the inverter 13, with the result that the voltage on the DC bus 40 is increased. More specifically, the electric charge will be stored in the electrolytic capacitor connected to the DC bus 40.

As described above, the converter control circuit 22 controls, for basic control, the DC-DC converter 21 so that the amount of discharge from the power storage unit 3 to the DC-DC converter 21 or the amount of charge from the DC-DC converter 21 to the power storage unit 3 is as designated by the command value transmitted from the system control circuit 15. Further, the converter control circuit 22 preferentially controls the DC-DC converter 21 so that the voltage on the DC bus 40 does not exceed a second threshold voltage. This control is performed in preference to the control for matching the output with the value designated by the command value transmitted from the system control circuit 15. The second threshold value is set to be higher than the first threshold value.

As described above, the converter control circuit 12 subjects, for basic control, the DC-DC converter 11 to MPPT control to maximize the output power of the solar cell 2. Further, the converter control circuit 12 preferentially controls the DC-DC converter 11 so that the voltage on the DC bus 40 does not exceed a third threshold voltage. The control is performed in preference to the MPPT control. The third threshold voltage is set to be higher than the second threshold voltage.

The first threshold voltage is set to be the voltage on the DC bus 40 in a normal state. In the case that the system voltage is AC 200 V, the first threshold voltage is set to be, for example, in a range DC 280 V-360 V. The second threshold voltage is set to, for example, 390 V, and the third threshold voltage is set to, for example, 410 V. When the voltage on the DC bus 40 is increased due to the suppression of the output of the inverter 13 to cause the voltage on the DC bus 40 to reach the second threshold voltage, the DC-DC converter 21 of the power storage unit 3 starts to suppress the bus voltage. When the energy to increase the voltage on the DC bus 40 is larger than the energy to suppress an increase provided by the DC-DC converter 21 of the power storage unit 3, the voltage on the DC bus 40 is further increased. When the voltage on the DC bus 40 reaches the third threshold voltage, the DC-DC converter 11 of the solar cell 2 starts to suppress the bus voltage.

When it is desired to reduce the initial investment in the power conversion system 1 shown in FIG. 1, the operation may be started by using the first power converter 10 alone (i.e., using the system as a photovoltaic power generation system) without connecting the second power converter 20 to the system. In this case, a reverse power flow from the solar cell 2 to the system 4 is not prohibited. It is therefore common that the system is sold without a reverse power flow suppression function equipped in the first power converter 10. If the second power converter 20 is additionally connected in this case, there is a risk of starting the operation of the power conversion system 1 without a reverse power flow suppression function being activated.

Conversely, it may be desired to remove the second power converter 20 from the power conversion system 1 in the state shown in FIG. 1. If the power storage unit 3 is hardly being used, for example, the deterioration of the power storage unit 3 can be suppressed better by removing the second power converter 20 from the DC bus 40. If the user forgets turning off the reverse power flow suppression function in the power conversion system 1 in which the second power converter 20 is removed, the reverse power flow from the solar cell 2 to the system 4 is suppressed, prohibiting the user from obtaining an economical benefit from the sales of power.

This is addressed in the embodiment by equipping the first power converter 10 with a reverse power flow suppression function and introducing a scheme of turning on/off the reverse power flow suppression function depending on whether the second power converter 20 is connected or not. More specifically, a scheme of activating/deactivating a code related to reverse power flow suppression in the firmware installed in the system control circuit 15 is introduced.

Figure 2:
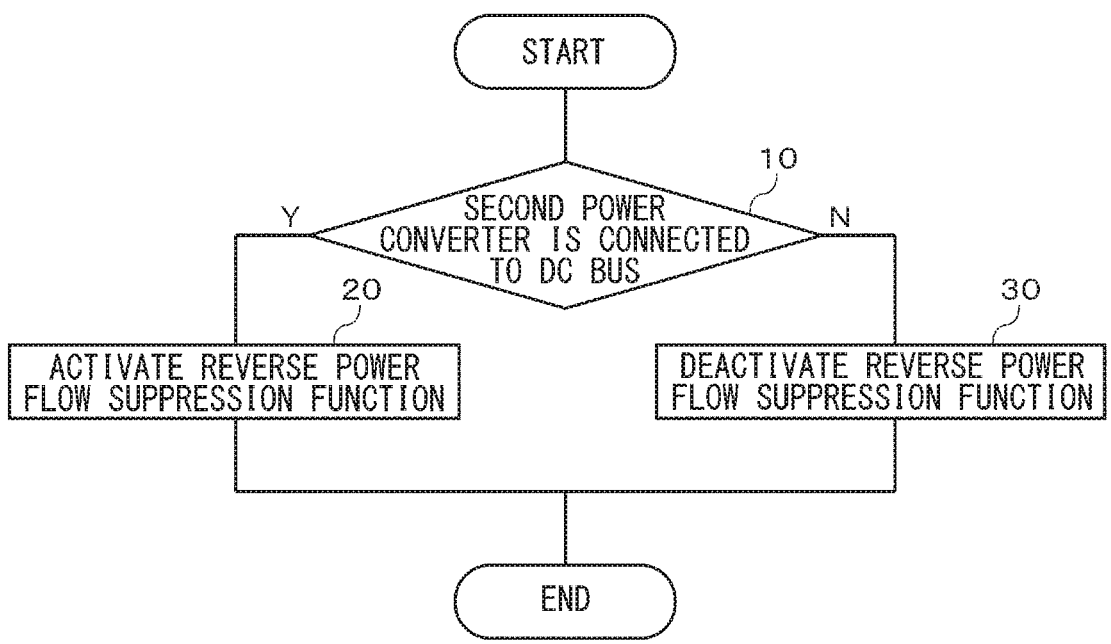
FIG. 2 is a flowchart showing how the reverse power flow suppression function is dealt with according to the embodiment.

FIG. 2 is a flowchart showing how the reverse power flow suppression function is dealt with according to the embodiment. The system control circuit 15 of the first power converter 10 determines whether the second power converter 20 is connected to the DC bus 40 (S10). When the second power converter 20 is connected (Y in S10), the system control circuit 15 activates the reverse power flow suppression function (S20). When the second power converter 20 is not connected (N in S10), the system control circuit 15 deactivates the reverse power flow suppression function (S30).

The system control circuit 15 can recognize that the second power converter 20 is connected to the DC bus 40 by various method listed below. In the first method, the worker manually sets the connection of the second power converter 20 to the DC bus 40. For example, the worker uses a mode setting screen of the user operation display device 30 and switches from the photovoltaic power generation mode to the coordinated generation-storage mode. When the second power converter 20 is removed, the worker switches from the coordinated generation-storage mode to the photovoltaic power generation mode. The user operation display device 30 generates an operation signal generated by the user operation and transmits the signal to the system control circuit 15 via the communication line 43. A physical switch for selecting the photovoltaic power generation mode or the coordinated generation-storage mode may be provided in the housing the first power converter 10. When the user connects the second power converter 20 to the DC bus 40, the user manually sets a change in the system configuration.

In the second method, a contact sensor or a pressure sensor 44 is provided at a node on the DC bus 40 connected to the wiring of the second power converter 20 or in the neighborhood of the node to physically detect whether the wiring of the second power converter 20 is connected to the node on the DC bus 40. The system control circuit 15 refers to the value detected by the contact sensor or the pressure sensor 44 and determines whether the second power converter 20 is connected to the DC bus 40.

In the third method, the voltage on the DC bus 40 is detected while the DC-DC converter 11 of the solar cell 2 and the inverter 13 are placed in a high-impedance state, thereby detecting whether the second power converter 20 is connected to the DC bus 40. In a state in which the second power converter 20 is connected to the DC bus 40, a voltage commensurate with the battery voltage occurs on the DC bus 40 even if the DC-DC converter 21 is not stepped up, provided that DC-DC converter 21 is not in a high-impedance state. The system control circuit 15 determines whether the second power converter 20 is connected to the DC bus 40 by referring to the voltage detected on the DC bus 40.

In the fourth method, whether the second power converter 20 is connected to the DC bus 40 is detected by checking whether voltage is conducted between the system control circuit 15 and the converter control circuit 22 via the communication line 43. When the terminal of the port connected to the communication line 43 changes from a high-impedance state, a floating state, or a pull-up state to a state of conduction to the converter control circuit 22, the system control circuit 15 determines that the second power converter 20 is connected to the DC bus 40.

A determination that the second power converter 20 is connected to the DC bus 40 may be made at a point of time when a predetermined signal is received by the system control circuit 15 from the converter control circuit 22. Alternatively, a determination that the second power converter 20 is connected to the DC bus 40 may be made at a point of time when a communication channel is established between the system control circuit 15 and the converter control circuit 22 according to a procedure for establishing a communication channel in compliance with a predetermined communication standard. Generally, a contractor first connects a power line between the first power converter 10 and the second power converter 20 and connects the communication line 43 later. It can therefore be surmised that the connection of the power line is completed when the connection of the communication line 43 is confirmed.

As described above, the embodiment optimizes handling of a reverse power flow by turning the reverse power flow suppression function on/off depending on whether the second power converter 20 is connected to the DC bus 40 or not. When one of the second through fourth methods is used, in particular, the reverse power flow suppression function is automatically turned on/off depending on the whether the second power converter 20 is connected or not. Therefore, suppression of a reverse power flow in the photovoltaic power generation mode or violation of a regulation that causes a reverse power flow from the power storage unit 3 in the coordinated generation-storage mode are prevented from occurring due a human mistake. Further, according to the second and third methods, whether the second power converter 20 is connected or not can be automatically detected even in a coordinated generation-storage system in which the communication line 43 is not used.

The detection line for detecting a reverse current flow or a reverse power flow is connected to the first power converter 10 either in the photovoltaic power generation mode or in the coordinated generation-storage mode. It not necessary to connect the detection line to the second power converter 20 when the second power converter 20 is added. There is no need to re-connect the detection line from the second power converter 20 to the first power converter 10 when the second power converter 20 is removed. As described above, the software in the system control circuit 15 automatically turns on/off the reverse power flow suppression function. Accordingly, attachment/detachment of the second power converter 20 only requires connection/disconnection of the power line and the communication line 43 so that the job of attaching/detaching the second power converter 20 is simplified.

Given above is an explanation based on an exemplary embodiment. The embodiment is intended to be illustrative only and it will be obvious to those skilled in the art that various modifications to constituting elements and processes could be developed and that such modifications are also within the scope of the present invention.

FIG. 1 depicts the inverter control circuit 14 and the system control circuit 15 as being isolated. The circuits may be implemented by separate microcomputers or implemented by one microcomputer. In the above embodiment, a description is given of a case where the first power converter 10 and the second power converter 20 are installed in separate housings. A configuration in which the first power converter 10 and the second power converter 20 are installed in one housing and the system control circuit 15 and the converter control circuit 22 are connected by the communication line 42 is also encompassed by the embodiment. In other words, the embodiment is applicable to a case where a module for the power storage unit 3 is added or removed in one housing.

In the above embodiment, a description is given of a case where the solar cell 2 is connected to the first power converter 10. Any of other power generators that use a renewable energy such as a wind power generator, a micro-hydraulic power generator, etc. may be connected in place of the solar cell 2.

The embodiments may be defined by the following items.

[Item 1]

A power converter (10) including:

a first DC-DC converter (11) that converts a voltage of a DC power output from a power generator (2) that generates power based on a renewable energy and outputs the DC power as converted to a DC bus (40); and an inverter (13) connected via the DC bus (40) to convert the DC power on the DC bus (40) into an AC power and supplies the AC power as converted to a load (5) or a power system (4); and a control circuit (14, 15) that controls the inverter (13), wherein a second DC-DC converter (21) that controls an input and an output of a power storage unit (3) is connectable to the DC bus (40), and the control circuit (14, 15) deactivates a reverse power flow suppression function for suppressing a reverse power flow from the inverter (13) to the power system (4) when the second DC-DC converter (21) is not connected to the DC bus (40) and activates the reverse power flow suppression function when the second DC-DC converter (21) is connected to the DC bus (40).

According to this, handling of a reverse power flow is optimized depending on the system configuration.

[Item 2]

The power converter (10) according to item 1, wherein the control circuit (14, 15) activates the reverse power flow suppression function when connection of the second DC-DC converter (21) to the DC bus (40) is detected and deactivates the reverse power flow suppression function when disconnection of the second DC-DC converter (21) from the DC bus (40) is detected.

According to this, the reverse power flow suppression function is turned on/off in response to connection/disconnection of the second DC-DC converter (21).

[Item 3]

The power converter (10) according to item 2, wherein, when voltage is conducted via a communication line (43) between a control circuit (14, 15) of the inverter (13) and a converter control circuit (22) that controls the second DC-DC converter (21), the control circuit (14, 15) of the inverter (13) activates the reverse power flow suppression function, and, when voltage is no longer conducted via the communication line (43), the control circuit (14, 15) of the inverter (13) deactivates the reverse power flow suppression function.

According to this, a determination as to whether the second DC-DC converter (21) is connected or not can be made without requiring a human operation.

[Item 4]

The power converter (10) according to item 1 or 2, wherein the control circuit (14, 15) detects whether the second DC-DC converter (21) is connected to the DC bus (40) or not by referring to a value detected by a contact sensor or a pressure sensor provided at a node on the DC bus (40) connected to the second DC-DC converter (21) or a neighborhood of the node.

According to this, a determination as to whether the second DC-DC converter (21) is connected or not can be made without requiring a human operation.

[Item 5]

The power converter (10) according to item 1 or 2, wherein the control circuit (14, 15) activates or deactivates the reverse power flow suppression function by referring to an operation signal generated by a operation of a worker or a user.

According to this, the reverse power flow suppression function can be turned on/off manually.

[Item 6]

A power conversion system (1) including a first power converter (10) and a second power converter (20), wherein the first power converter (10) includes:

a first DC-DC converter (11) that converts a voltage of a DC power output from a power generator (2) that generates power based on a renewable energy and outputs the DC power as converted to a DC bus (40); and an inverter (13) connected to the first DC-DC converter (11) via the DC bus (40) to convert the DC power on the DC bus (40) into an AC power and supplies the AC power as converted to a power system; and a first control circuit (14, 15) that controls the inverter (13), wherein the second power converter (20) includes:

a second DC-DC converter (21) that controls an input and an output of a power storage unit (3); and a second control circuit (22) that controls the second DC-DC converter (21), wherein the first control circuit (14, 15) deactivates a reverse power flow suppression function for suppressing a reverse power flow from the inverter (13) to the power system (4) when the second DC-DC converter (21) is not connected to the DC bus (40) and activates the reverse power flow suppression function when the second DC-DC converter (21) is connected to the DC bus.

According to this, handling of a reverse power flow is optimized depending on the system configuration.

What is claimed is:

1. A power converter comprising:
    a first DC-DC converter that converts a voltage of a DC power output from a power generator that generates power based on a renewable energy and outputs the DC power as converted to a DC bus; and
    an inverter connected via the DC bus to convert the DC power on the DC bus into an AC power and supplies the AC power as converted to a load or a power system; and
    a control circuit that controls the inverter, wherein
    a second DC-DC converter that controls an input and an output of a power storage unit is connectable to the DC bus, and
    the control circuit deactivates a reverse power flow suppression function for suppressing a reverse power flow from the inverter to the power system when the second DC-DC converter is not physically and electrically connected to the DC bus and activates the reverse power flow suppression function when the second DC-DC converter is physically and electrically connected to the DC bus, wherein
    in a situation where the reverse power flow suppression function is activated, when a reverse power flow from the inverter to the power system is detected, the control circuit suppresses the output power of the inverter and
    in a situation where the reverse power flow suppression function is deactivated, even if a reverse power flow from the inverter to the power system is detected, the control circuit does not suppress the output power of the inverter.

2. The power converter according to claim 1, wherein
    the control circuit activates the reverse power flow suppression function when connection of the second DC-DC converter to the DC bus is detected and deactivates the reverse power flow suppression function when disconnection of the second DC-DC converter from the DC bus is detected, wherein
    when voltage current is conducted via a communication line between the control circuit of the inverter and a converter control circuit that controls the second DC-DC converter, the control circuit of the inverter activates the reverse power flow suppression function, and, when voltage is no longer conducted via the communication line, the control circuit of the inverter deactivates the reverse power flow suppression function.

3. The power converter according to claim 1, wherein the control circuit activates the reverse power flow suppression function when connection of the second DC-DC converter to the DC bus is detected and deactivates the reverse power flow suppression function when disconnection of the second DC-DC converter from the DC bus is detected, wherein the control circuit detects whether the second DC-DC converter is connected to the DC bus or not by referring to a value detected by a contact sensor or a pressure sensor provided at a node on the DC bus connected to the second DC-DC converter or a neighborhood of the node.

4. The power converter according to claim 1, wherein the control circuit activates or deactivates the reverse power flow suppression function by referring to an operation signal generated by an operation of a worker or a user.

5. The power converter according to claim 1, wherein deactivating the reverse power flow suppression function comprises deactivating a program code related to reverse power flow suppression in a firmware installed in the control circuit, and wherein activating the reverse power flow suppression function comprises activating the program code related to reverse power flow suppression in the firmware installed in the control circuit.

6. A power conversion system including a first power converter and a second power converter, wherein the first power converter includes:
a first DC-DC converter that converts a voltage of a DC power output from a power generator that generates power based on a renewable energy and outputs the DC power as converted to a DC bus; and
an inverter connected to the first DC-DC converter via the DC bus to convert the DC power on the DC bus into an AC power and supplies the AC power as converted to a power system; and
a first control circuit that controls the inverter, wherein the second power converter includes:
a second DC-DC converter that controls an input and an output of a power storage unit; and
a second control circuit that controls the second DC-DC converter, wherein the first control circuit deactivates a reverse power flow suppression function for suppressing a reverse power flow from the inverter to the power system when the second DC-DC converter is not physically and electrically connected to the DC bus and activates the reverse power flow suppression function when the second DC-DC converter is physically and electrically connected to the DC bus, wherein in a situation where the reverse power flow suppression function is activated, when a reverse power flow from the inverter to the power system is detected, the first control circuit suppresses the output power of the inverter and in a situation where the reverse power flow suppression function is deactivated, even if a reverse power flow from the inverter to the power system is detected, the first control circuit does not suppress the output power of the inverter.

7. The power conversion system according to claim 6, wherein deactivating the reverse power flow suppression function comprises deactivating a program code related to reverse power flow suppression in a firmware installed in the first control circuit, and wherein activating the reverse power flow suppression function comprises activating the program code related to reverse power flow suppression in the firmware installed in the first control circuit.

* * * * *